(12) United States Patent
Granshaw et al.

(10) Patent No.: US 9,386,087 B2
(45) Date of Patent: Jul. 5, 2016

(54) WORKLOAD PLACEMENT IN A COMPUTER SYSTEM

(71) Applicant: International Business Machines Corporation, Armonk, NY (US)

(72) Inventors: David Granshaw, Hursley (GB);
Samuel T. Massey, Hursley (GB);
Daniel J. McGinnes, Hursley (GB);
Martin A. Ross, Hursley (GB); Richard G. Schofield, Hursley (GB); Craig H. Stirling, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 14/221,021

(22) Filed: Mar. 20, 2014

(65) Prior Publication Data

US 2014/0317172 A1 Oct. 23, 2014

(30) Foreign Application Priority Data

Mar. 21, 2013 (GB) .................................. 1305211.3

(51) Int. Cl.

| | |
|---|---|
| *G06F 9/455* | (2006.01) |
| *H04J 3/16* | (2006.01) |
| *H04L 29/08* | (2006.01) |
| *H04L 12/26* | (2006.01) |
| *G06F 9/50* | (2006.01) |
| *G06F 11/34* | (2006.01) |

(52) U.S. Cl.
CPC ........ *H04L 67/1008* (2013.01); *H04L 43/0876* (2013.01); *G06F 9/5083* (2013.01); *G06F 11/3409* (2013.01); *G06F 11/3442* (2013.01); *G06F 2201/81* (2013.01); *G06F 2209/508* (2013.01); *H04L 29/08846* (2013.01); *H04L 67/1002* (2013.01); *H04L 67/2814* (2013.01)

(58) Field of Classification Search
CPC .............. G06F 9/5083; G06F 11/3409; G06F 11/3442; G06F 2201/81; G06F 2209/508; H04L 29/08846; H04L 67/1002; H04L 67/2814
See application file for complete search history.

(56) References Cited

U.S. PATENT DOCUMENTS

| | | | |
|---|---|---|---|
| 8,250,185 | B2 | 8/2012 | Bauer et al. |
| 8,880,679 | B2 * | 11/2014 | Sharma .......................... 709/219 |
| 2002/0095400 | A1 * | 7/2002 | Johnson ................ H04L 41/147 |
| 2007/0168696 | A1 * | 7/2007 | Ridel .................. G06F 11/3495 714/4.1 |
| 2007/0169127 | A1 * | 7/2007 | Kashyap ............... G06F 9/5077 718/104 |
| 2008/0049786 | A1 * | 2/2008 | Ram ..................... G06F 9/5083 370/468 |
| 2008/0225710 | A1 * | 9/2008 | Raja ........................ G06F 9/505 370/230.1 |
| 2008/0250097 | A1 | 10/2008 | Angelini et al. |

(Continued)

OTHER PUBLICATIONS

Masternak et al., "ESB—Modern SOA Infrastructure," AGH University of Science and Technology in Kraków, Feb. 2013, 28 pages.

(Continued)

*Primary Examiner* — Nicholas Taylor
*Assistant Examiner* — Ho Shiu
(74) *Attorney, Agent, or Firm* — Yee & Associates, P.C.; Parashos Kalaitzis

(57) ABSTRACT

A system for workflow placement in a computer system wherein the performance of a system processing a workflow is monitored against one or more performance measures. One or more logic elements from the workflow are delegated for subsequent processing to other systems in the computer system in response to one or more of the one or more performance measures being within a predetermined range.

20 Claims, 9 Drawing Sheets

(56) References Cited

U.S. PATENT DOCUMENTS

| | | | |
|---|---|---|---|
| 2009/0006541 A1* | 1/2009 | Baba | G06F 9/505 709/203 |
| 2009/0019535 A1* | 1/2009 | Mishra | G06Q 10/00 726/12 |
| 2009/0043631 A1* | 2/2009 | Finlayson | G06Q 10/06 705/7.17 |
| 2010/0093438 A1* | 4/2010 | Baszucki | A63F 13/12 463/42 |
| 2010/0128598 A1* | 5/2010 | Gandhewar | H04L 67/2814 370/217 |
| 2011/0289512 A1 | 11/2011 | Vecera et al. | |
| 2012/0124193 A1 | 5/2012 | Ebrahim et al. | |
| 2012/0143634 A1 | 6/2012 | Beyda et al. | |
| 2012/0167092 A1* | 6/2012 | Delchev | G06Q 10/06 718/100 |
| 2012/0210335 A1 | 8/2012 | Salt et al. | |
| 2012/0239818 A1 | 9/2012 | Defayet et al. | |
| 2013/0014107 A1* | 1/2013 | Kirchhofer | G06F 9/5083 718/1 |
| 2013/0111467 A1* | 5/2013 | Sundararaj | G06F 9/505 717/176 |
| 2013/0198393 A1* | 8/2013 | Etani | H04L 67/14 709/227 |
| 2014/0059204 A1* | 2/2014 | Nguyen | H04L 43/045 709/224 |
| 2014/0068611 A1* | 3/2014 | McGrath | G06F 9/45533 718/1 |

OTHER PUBLICATIONS

Perepa et al., "Strengthening Your ESB with WebSphere Service Registry and Repository," International Business Machines Corporation, ibm.com, Oct. 21, 2010, 50 pages.

Schmidt et al., "The Enterprise Service Bus: Making service-oriented architecture real," IBM Systems Journal, vol. 44, No. 4, Oct. 2005, pp. 781-797.

* cited by examiner

WORKLOAD PLACEMENT IN A COMPUTER SYSTEM

This Application is a counterpart of and claims the benefit of priority to United Kingdom Patent Office Application Serial No. GB1305211.3, filed on Mar. 21, 2013, the contents of which are hereby incorporated by reference.

BACKGROUND

1. Field

The present invention relates to workload placement in a computer system.

2. Description of the Related Art

Computer systems commonly comprise a group of subsystems arranged to intercommunicate, typically arranged in a client/server or a client/server/target architecture. A given subsystem may be implemented as a client, server or target application program. Such computer systems may be implemented on a single computer or on a set of one or more computers interconnected by one or more networks with the client, server or target application programs being distributed across the set of computers.

The functionality of such computer systems is typically provided by collaboration of the client, server or target application programs via respective contributions to shared workload. Such workload is typically made up of multiple workflows comprising a set of logic units or modules, each logic module being arranged for processing by one of the client, server or target application programs. In other words, the logic modules of a given workflow may be partitioned with a given partition assigned to the relevant client, server or target application program processing the workflow.

One problem with such distributed processing of workflows is that if a given sub-system becomes strained, for example due to a shortage of processing resources, a bottleneck may be created in the workflow resulting in a degradation of the performance of the workflow as a whole.

SUMMARY

An embodiment of the invention provides apparatus for workload placement in a computer system the apparatus comprising: a processing component arranged for processing a workflow across a first and second systems, the workflow comprising a first partition of one or more logic modules processed by the first system and a second partition of one or more logic modules processed by the second system. A monitoring component is arranged for monitoring the performance of the second system in response to the processing of the workflow against one or more performance measures. An identifying component identifies one or more logic modules in the second partition that may be processed by the first system if one or more of the performance measures is within predetermined range. A repartitioning component is arranged for repartitioning the identified logic modules from the second partition to the first partition so that subsequent processing of the identified logic modules is performed by the first system in one or more subsequent instances of the workflow.

Embodiments of the invention enable one or more workflows to be repartitioned across the systems that process the workflows to reduce the affect of shortages in system resources, such as processing or network capacity, on the performance of the workflows.

The first system comprises a client system and the second system comprises a server system. The computer system may comprise an Enterprise Service Bus (ESB) and the first system comprises an ESB client and the second system comprises an ESB server. The workload comprises ESB logic. The logic modules comprise ESB logic modules. The workload comprises mediation logic. The performance measures comprise one or more measures of the performance of the machine on which the second system is running. The performance measures comprise one or more measures of the performance of the processing of one or more workflows. The performance measures comprise one or more measures of network performance or capacity between the first and second systems.

The identification of the one or more logic modules in the second partition processed by the first system is performed using a predetermined identification of delegable logic modules. The identification of the one or more logic modules in the second partition processed by the first system is performed in cooperation between the first and second systems. The apparatus is arranged to determine capacity of the first system for processing the identified logic modules and only perform the repartitioning of the workflow if the capacity of the first system meets a predetermined threshold. The processing of the identified logic modules from the second partition may be delegated to a third system so that processing of the identified logic modules is performed by the third system in one or more subsequent instances of the workflow. The repartitioning of the identified logic units is performed for the given workflow with respect to the first and second systems. The repartitioning of the identified logic units is performed with respect to one or more other associated workflows with respect to the first and second systems. The repartitioning of the identified logic units is performed with respect to the given workflow with respect to the second system and one or more other systems.

Another embodiment provides a method for workload placement in a computer system the method comprising the steps of processing a workflow across a first and second systems, the workflow comprising a first partition of one or more logic modules processed by the first systems and a second partition of one or more logic modules processed by the second system; monitoring the performance of the second system in response to the processing of the workflow against one or more performance measures; if one or more of the performance measures falls within predetermined range then identifying one or more logic modules in the second partition that may be processed by the first system; and repartitioning the identified logic modules from the second partition to the first partition so that subsequent processing of the identified logic modules is performed by the first system in one or more subsequent instances of the workflow.

A computer program product for workload placement comprising computer executable instructions stored on a computer readable non-propagation medium and loadable into a memory of a computer, which when executed by the computer direct the computer to process a workflow across a first and second systems, the workflow comprising a first partition of one or more logic modules processed by the first systems and a second partition of one or more logic modules processed by the second system; monitor the performance of the second system in response to the processing of the workflow against one or more performance measures; in response to one or more of the performance measures being within a predetermined range, identify one or more logic modules in the second partition that may be processed by the first system; and repartition the identified logic modules from the second partition to the first partition so that subsequent processing of the identified logic modules is performed by the first system in one or more subsequent instances of the workflow.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the invention will now be described, by way of example only, with reference to the following drawings in which.

DETAILED DESCRIPTION

Figure 1:
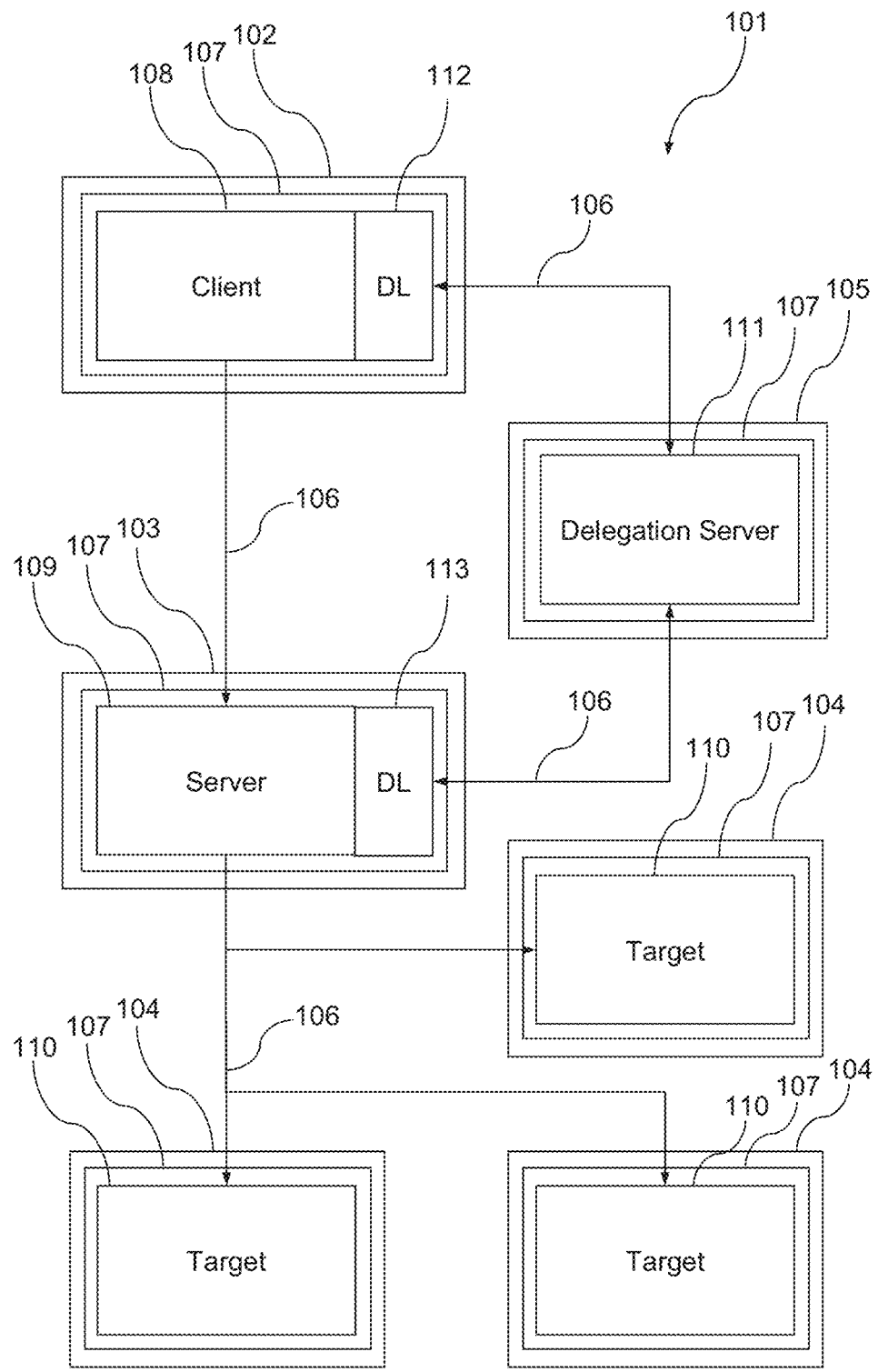
FIG. 1 is a schematic representation of a distributed computer system comprising client, server and target systems.

With reference to FIG. 1, a computer system 101 comprises a first, second, third and fourth computers 102, 103, 104, 105 interconnected over a network 106. The computers 102, 103, 104, 105 are each running a respective operating system 107 arranged to provide a platform for running one or more application programs. In the present embodiment, the first computer 102 is running a client application program 108, the second computer 103 is running a server program 109, each of the third computers 104 is running a target application program 110 and the fourth computer 105 is running a delegation server application program 111. The client application program 108 is arranged to make requests to the server application program 109. The server application program 109 is arranged to select relevant services from one or more of the target application programs 110 to meet each request from the client application program 108.

In the present embodiment, communications between application programs are performed using a messaging system arranged to manage or mediate multiple requests and responses between the client and targets systems 108, 110. In the present embodiment, the messaging architecture selected is a variant of the client/server architecture in the form of the Enterprise Service Bus (ESB) messaging architecture. The Enterprise Service Bus (ESB) messaging architecture is arranged to enable a set of reusable services provided by the target systems 110 widely available to the client system 108 and other such client systems (not shown) that may request the services via the network 106. In the present embodiment, the messaging system functionality is implemented within the logic of the respective application programs 108, 109, 110. The Enterprise Service Bus (ESB) messaging architecture is well known in the art and its functionality will not be described in detail herein.

Each of the ESB messaging processes between the respective application programs 108, 109, 110 comprises a workflow. Each workflow comprises a partitioned set of logic modules, each partition being arranged for respective processing by the client, server or target application programs 108, 109, 110. In other words, the logic modules of a given workflow are partitioned and each partition assigned to the relevant client, server or target application program 108, 109, 110 processing the workflow. For example, a workflow processing a request from the client system 108 to the server system 109 may comprise three logic modules in a first partition for processing by the client system 108 and four logic modules in a second partition for processing by the server system 109. Typically workflows, such as ESB mediation processes, may be processed repeatedly or in parallel.

In the present embodiment, the delegation server application program 111 is arranged to monitor the performance of the server system 109 against a predetermined set of performance measures during its processing of workloads. The performance measures are arranged to provide indications that the processing of the server system 109 or computer 103 is over-utilizing the processing resources available. When one or more of the performance measures reach a predetermined level, in response to the processing of a set of one or more workflows, the delegation server 111 is arranged to select one or more of the relevant workflows and to delegate logic modules from the respective server partitions to the respective client partitions. In other words, selected logic modules in the workflow are reallocated from processing by the server system 109 for processing by the client system 108 in subsequent instances of the selected workflow. In the present embodiment, this process of logic module delegation or reallocation is performed dynamically, that is while workflow processing is ongoing. Such delegation or reallocation may be seen as the repartitioning of a workflow. The function of such delegation, reallocation or repartitioning is to alleviate the strain on processing resources of the monitored server system 109 as detected by the delegation server 111.

In the present embodiment, the client and server application programs 108, 109 are provided with logic for interfacing with the delegation server 111 in the form of respective delegation logic (DL) modules 112, 113. The DL modules 112, 113 enable the delegation server 111 to interact with the client and server systems 108, 109 so as to dynamically initiate and coordinate the delegation, reallocation or repartitioning of a selected workflow. The data and operation of the respective DL modules 112, 113 will be described further below.

Figure 2:
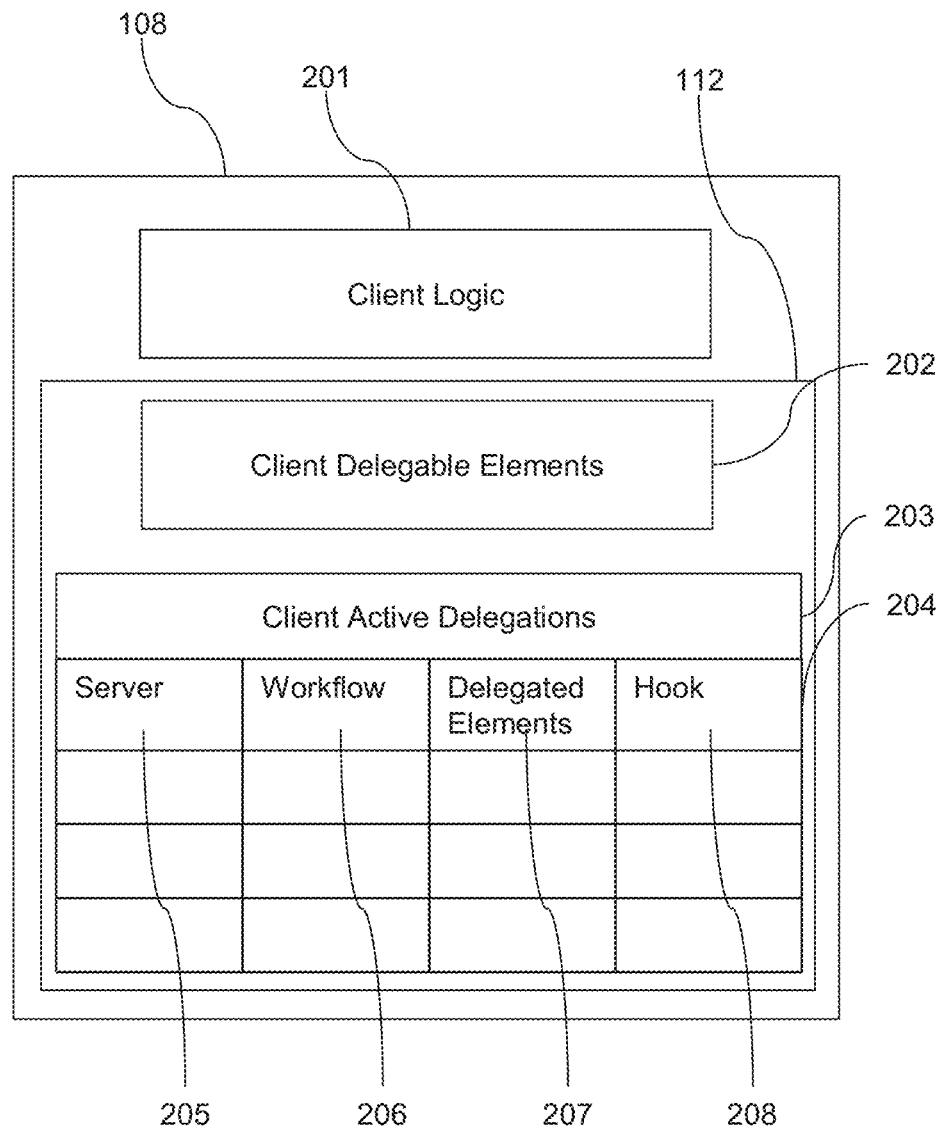
FIG. 2 is a schematic representation of logic and data provided in a client application program of FIG. 1.

With reference to FIG. 2, the client system 108 comprises client application logic 201 and the associated client delegation logic (DL) module 112. The DL module 112 comprises delegable elements data 202 and active delegations data 203. In the present embodiment, the delegable elements data 203 comprises data indicating which of the available ESB logic modules can be delegated to the client partition of a given workflow. In other words, the delegable elements data 203 indicates the ESB logic modules that, in any given workload, may be delegated for processing by the client system 108 in response to a delegation request received from the delegation server 111. The active delegations data 203 comprises a set of one or more delegation records 204 comprising data representing each delegation undertaken by the client application program 108 in response to a respective request from the delegation server 111. Each delegation record 204 comprises server data 205 identifying the server from which the relevant logic modules have been delegated, workflow data 206 identifying the workflow that has been repartitioned as a result of the delegation, delegated element data 207 identifying the relevant logic modules that have been delegated and hook data 208. The hook data 208 identifies the modified partition point in the workflow resulting from the relevant delegation. In other words, the hook data 208 represents the revised start point for processing by the relevant server system 109 of the delegated workflow. The hook data 208 is provided to the server system 109 in association with the results of the processing of the client partition of a delegated workflow so as to provide the receiving server system 109 with an indication of where in the workflow its processing should be initiated in the server partition of the workflow to take into account the relevant delegation. Since the server system 109 may process a number of instances of a given workflow each with a respective client system and each such workflow may be differently delegated, the hook data 208 enables the server system 109 to process each such differently delegated instance of the workflow appropriately.

Figure 3:
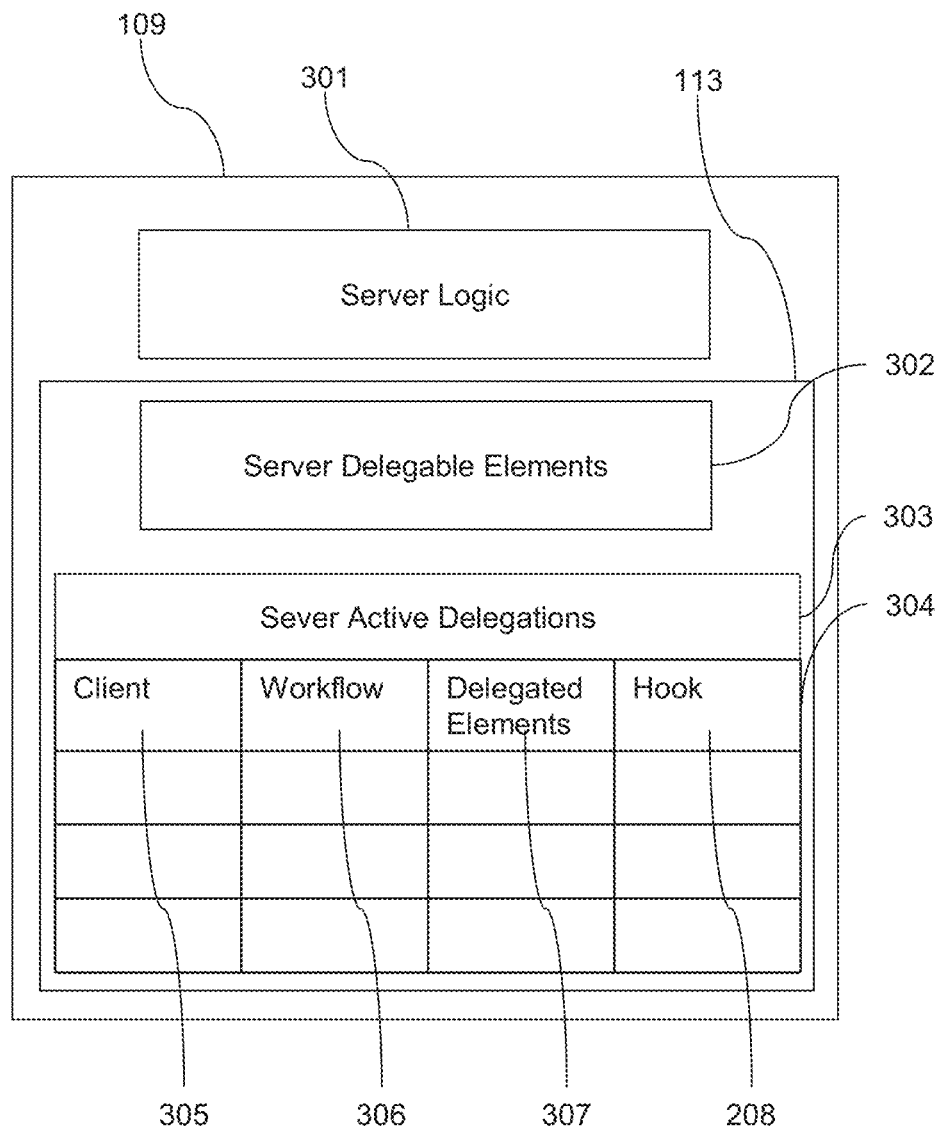
FIG. 3 is a schematic representation of logic and data provided in a server application program of FIG. 1.

With reference to FIG. 3, the server system 109 comprises server application logic 301 and the associated server delegation logic (DL) module 113. The DL module comprises delegable elements data 302 and active delegations data 303. In the present embodiment, the delegable elements data 302 comprises data indicating which ESB logic modules can be delegated from the server partition of a given workflow. In other words, the delegable elements data 302 indicates the ESB logic modules that, in any given workload, may be delegated to a client system in response to a delegation request received from the delegation server 111. The active delegations data 303 comprises a set of one or more delegation records 304 comprising data representing each delegation undertaken by the server application program 109 in response to a respective request from the delegation server 111. Each delegation record 304 comprises client data 305 identifying the client system to which the relevant logic modules have been delegated, workflow data 306 identifying the workflow that has been repartitioned as a result of the delegation, delegated element data 307 identifying the relevant logic modules that have been delegated and hook data 208 as described above.

Figure 4:
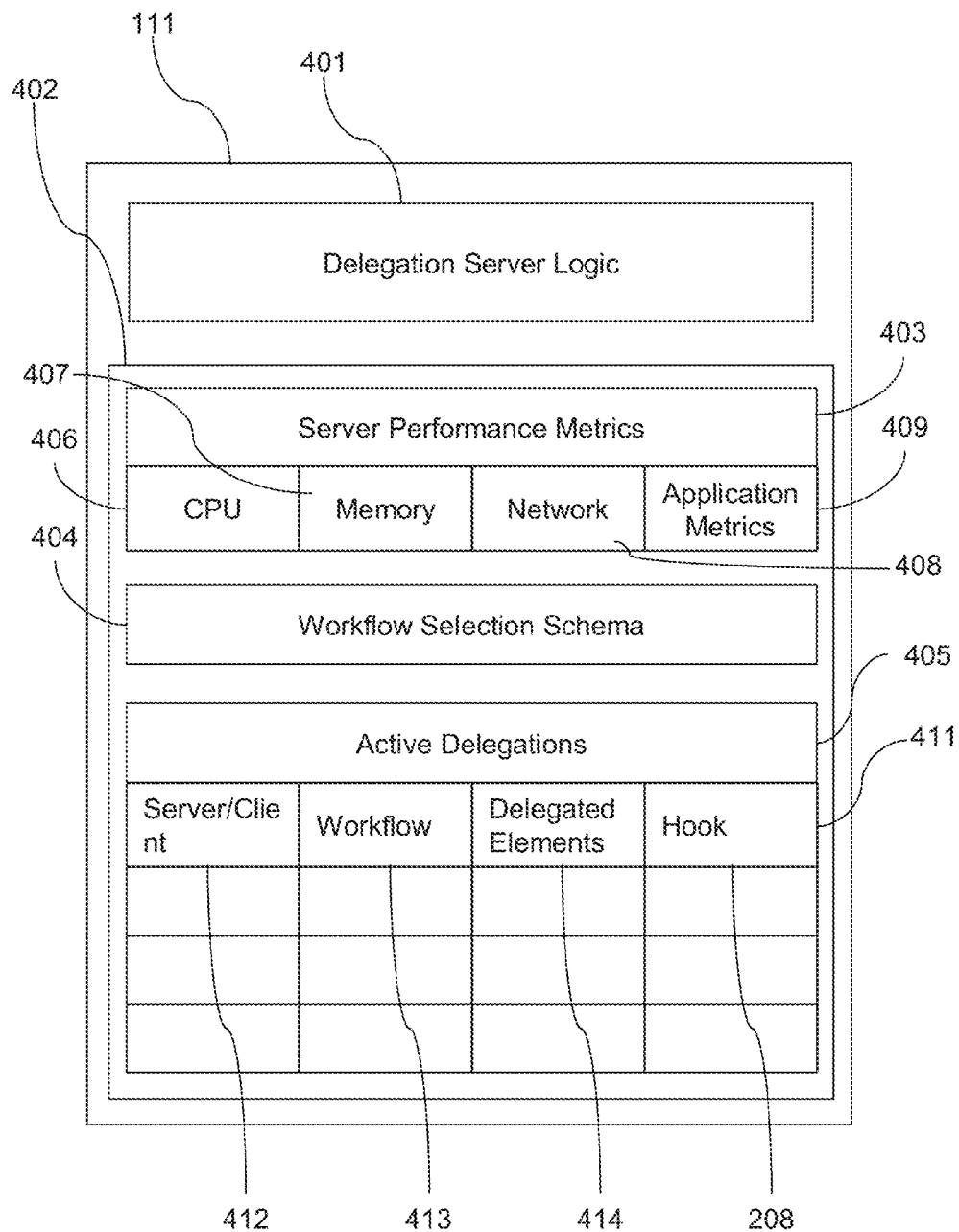
FIG. 4 is a schematic representation of logic and data provided in a delegation server application program of FIG. 1.

With reference to FIG. 4, the delegation server 111 comprises delegation server logic 401 and delegation data (DD) 402. The delegation data 402 comprises server performance metrics 403, a workload selection schema 404 and active delegations data 405. The server performance metrics 403 comprise a predetermined set of performance measures for the server system 109, second computer 103 and the network 106. Each such performance measure is also associated with a predetermined threshold arranged for determining when the level of a given performance measure indicates that the relevant part of the system is unacceptably strained and thus the delegation process for one or more relevant workloads is triggered. In the present embodiment, the performance metrics 403 comprise a CPU (central processor unit) utilization metric 406 and memory utilization metric 407 for the second computer 103, a network bandwidth utilization metric 408 for the client/server connection of the network 106 and a set of application program specific metrics 409 for the server system 109. Any one of the metrics 403, including the program specific metrics 409, may be specified or determined in a service level agreement (SLA) or other predetermined specification. One or more of the performance metrics 403, such as the program specific metrics 409, may comprise performance criteria for application to sets of one or more specified workflows.

The delegation data 402 further comprises a workload selection schema 404. When the performance of the monitored system such as the server system 109 meets one or more of the predetermined thresholds triggering the delegation process, the server system 109 may be processing more than one workload. In such a situation, the workload selection schema 404 comprises a set of rules for selecting, from the set of all workloads being processed by the server system 109, the subset of one or more workloads to which the delegation process is to be applied. In the present embodiment, the workload selection schema 404 is arranged to select all workflows for which the respective threshold is met for at least one of the four performance metrics 406, 407, 408, 409. As will be understood by those skilled in the art, any mechanism for selecting the workload for the delegation process may be employed in dependence on the requirements of the given system.

The active delegation data 405 is arranged to provide a record of all the currently active delegations initiated by the delegation server 111. The active delegations data 405 effectively comprises the combination of the corresponding data sets 203, 303 of each relevant client and server system 108, 109. The active delegations data 405 thus comprises a set of one or more delegation records 411 containing data representing each delegation initiated by the delegation server 111. Each delegation record 411 comprises client/server data 412 identifying the respective client and server systems 108, 109 between which the relevant logic modules have been delegated, workflow data 413 identifying the workflow that has been repartitioned as a result of the delegation, delegated element data 414 identifying the relevant logic modules that have been delegated and hook data 208 as described above.

Figure 5:
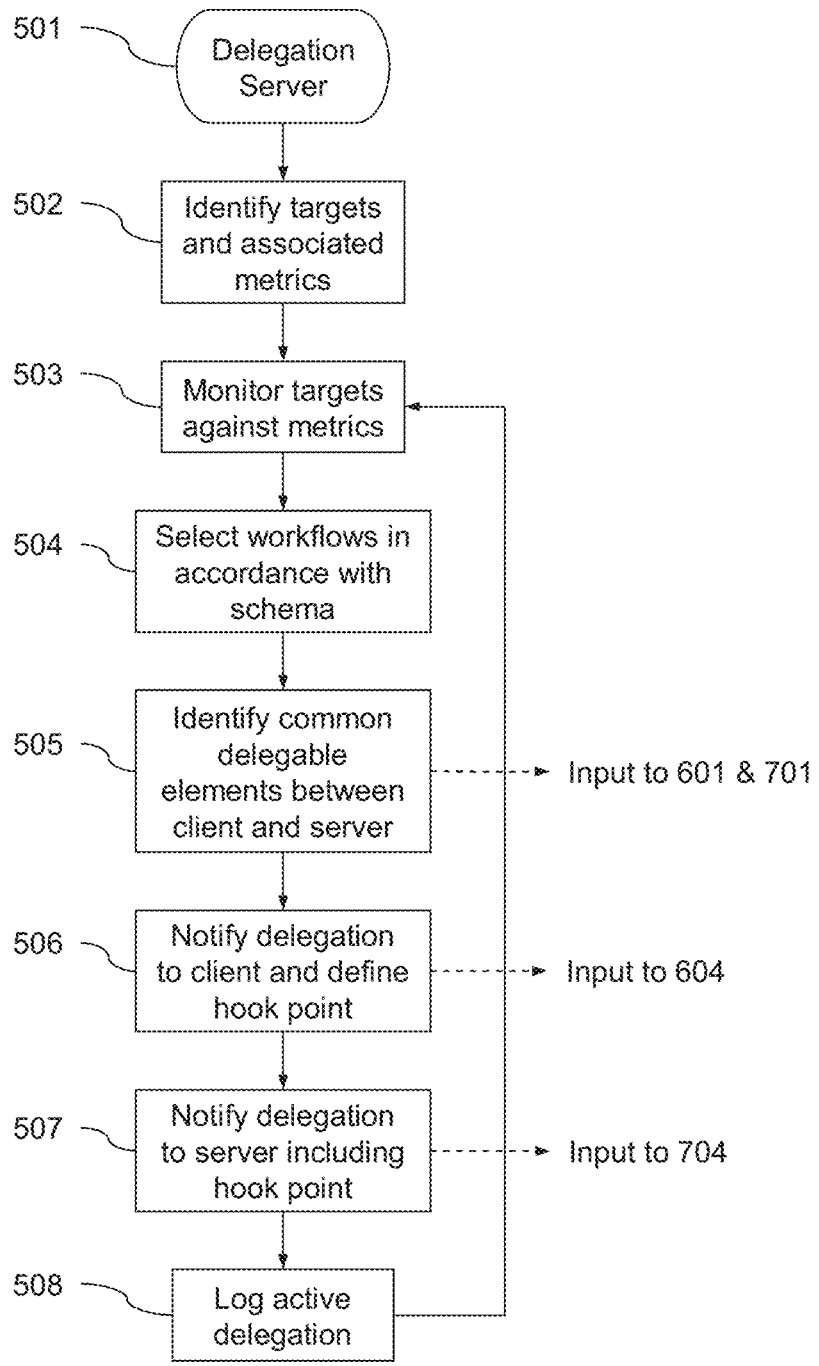
FIG. 5 is a flow chart illustrating processing performed by the client application program of FIG. 2.

The processing of the delegation server 111 when monitoring the performance of the server system 109 will now be described in further detail with reference to FIG. 5. Processing is initiated at step 501 in response to the startup of the delegation server 111 and processing moves to step 502. At step 502, the system to be monitored, in the form of the sever system 109, is identified from setup data provided by an administrator and processing moves to step 503. At step 503 the performance measures 403 are identified from the delegation data 402 and then monitored for the server system 109 against the predetermined thresholds until one or more threshold are met at which point processing moves to step 504. At step 504 one or more workflows running on the server system 109 are selected for repartitioning in accordance with the workflow selection schema 404 and processing moves to step 505. Steps 505 to 508 are performed for each selected workflow. At step 505 the client delegable elements data 202 of the relevant client system 108 and the server delegable elements data 302 of the server system 109 are interrogated with respect to the logic elements of the selected workflow to identify those logic elements of the workflow that may be delegated from processing by the server system 109 to processing by the client system 108 for the selected instance of the workflow and processing moves to step 506. At step 506 the delegation is notified to the client system 108 including the hook point 208 for communication to the server system 109 in association with the results of the processing of the revised client partition of the selected workflow. Once acknowledgement from the client system 108 that the delegation is pending is received then processing moves to step 507. At step 507 the delegation of the identified logic elements to the client partition of the workflow is notified to the server system 109 including the hook point 208 for use by the server system to determine the relevant partition point in the processing of the relevant instance of the workflow. Once acknowledgement from the server system 108 that the delegation is active is received then processing then moves to step 508. At step 508 a delegation record for the delegation is recorded in the active delegations data 405 and processing then moves to step 503 and proceeds as described above.

Figure 6:
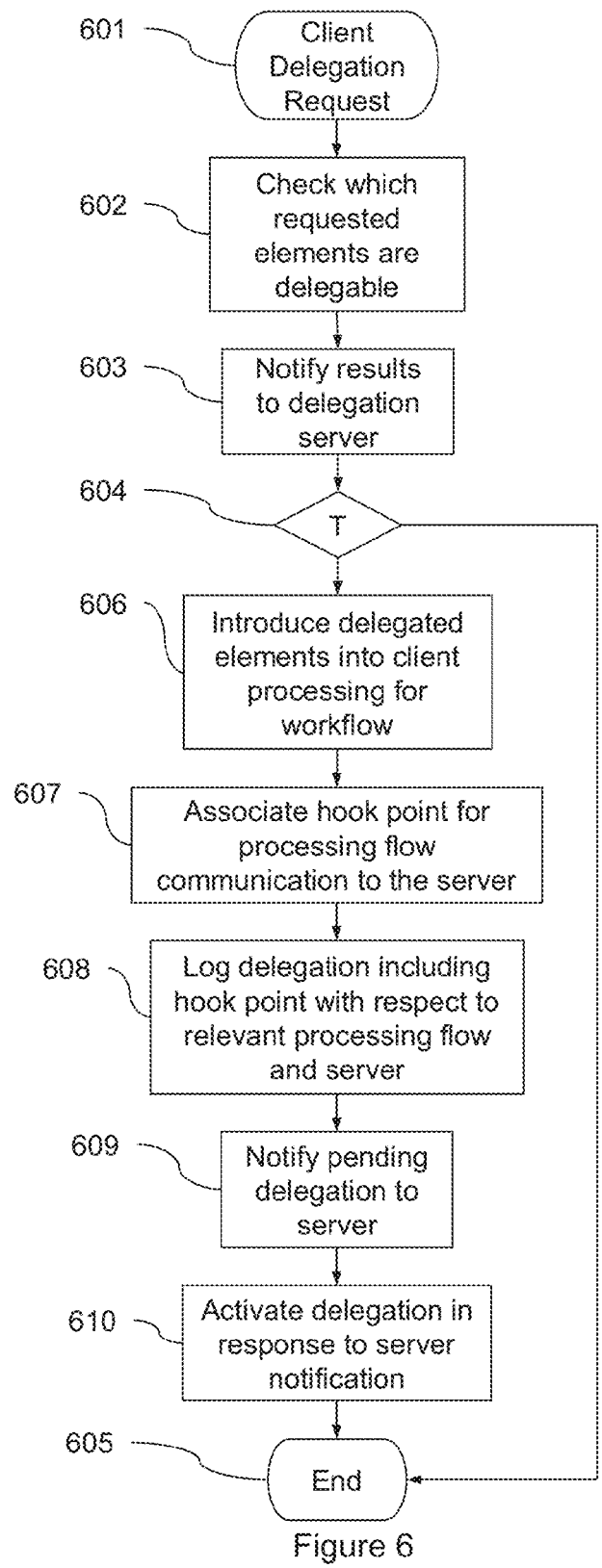
FIG. 6 is a flow chart illustrating processing performed by the server application program of FIG. 3.

The processing performed by the client system 108 in response to a delegation request from the delegation server 111 will now be described further with reference to the flow chart of FIG. 6. Processing is initiated at step 601 in response to a delegation request in the form of a request from step 505 of FIG. 5 and processing moves to step 602. At step 602 the set of workflow logic elements identified in the request from the delegation server 111 are checked against the client delegable elements data 202 and processing moves to step 603. At step 603 the delegable elements with respect to the request are communicated to the delegation server and processing moves to step 604. At step 604 processing awaits notification from step 506 in the processing of the delegation server 111 to proceed with the delegation, the notification comprising an indication of the delegated logic elements and an assigned hook point 208. If no such notification is received within a predetermined time-out period T then processing moves to step 605 and ends. If such a notification is received then processing moves to step 606. At step 606 the notified logic elements are introduced into the processing of the client partition of the workflow and processing moves to step 607. At step 607 the hook point 208 is associated with the repartitioned workflow so that the hook point 208 is communicated to the server system 109 appropriately and processing moves to step 608. At step 608 the details of the delegation are logged as a pending new entry 204 in the client active delegations data 203 and processing moves to step 609. At step 609 the pending delegation on the client system 108 is notified to the delegation server 111 and processing moves to step 610 where a notification is awaited from the server system 109 indicating that the activation of the delegation on the server system 109 is complete and once received the delegation is activated in the client active delegations data 203. Processing then moves to step 605 and ends.

Figure 7:
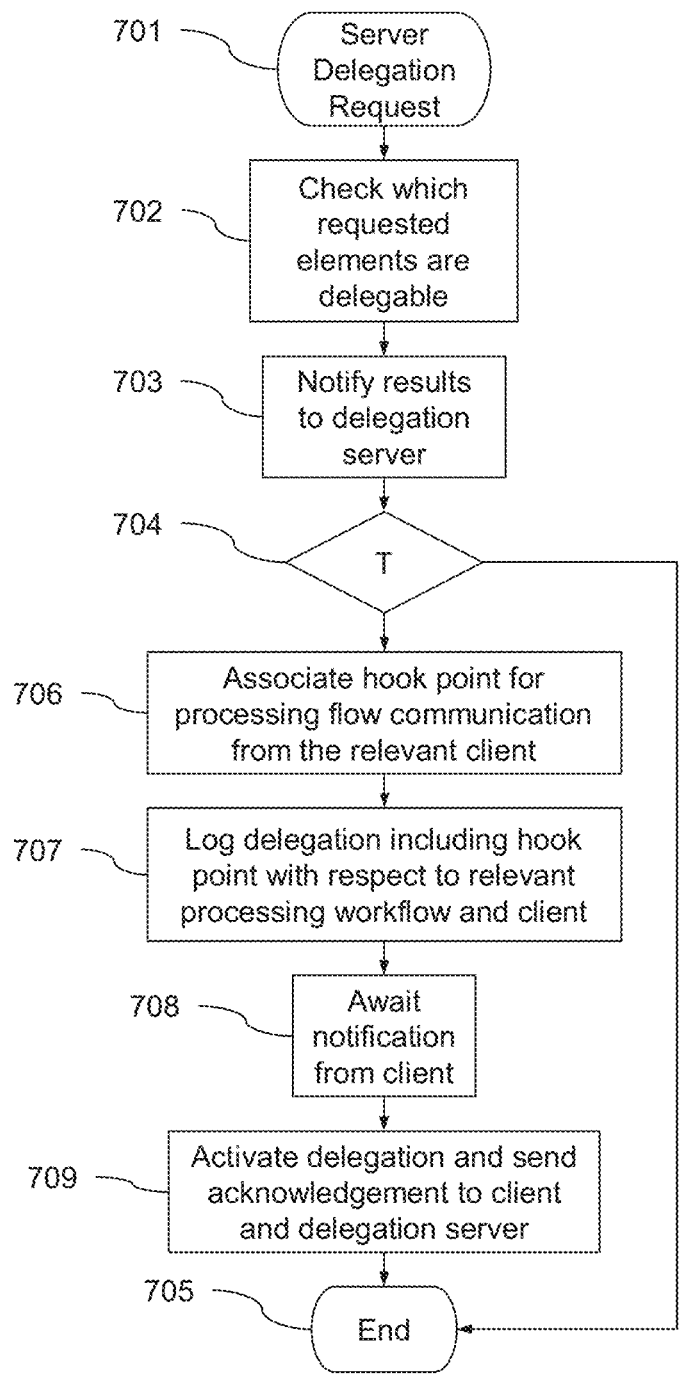
FIG. 7 is a flow chart illustrating processing performed by the delegation server application program of FIG. 4.

The processing performed by the server system 109 in response to a delegation request from the delegation server 111 will now be described further with reference to the flow chart of FIG. 7. Processing is initiated at step 701 in response to a delegation request in the form of a request from step 505 of FIG. 5 and processing moves to step 702. At step 702 the set of workflow logic elements identified in the request from the delegation server 111 are checked against the server delegable elements data 302 and processing moves to step 703. At step 703 the delegable elements with respect to the request are communicated to the delegation server and processing moves to step 704. At step 704 processing awaits notification from step 507 in the processing of the delegation server 111 to proceed with the delegation, the notification comprising an indication of the delegated logic elements and an assigned hook point 208. If no such notification is received within a predetermined time-out period T then processing moves to step 705 and ends. If such a notification is received then processing moves to step 706. At step 706 the hook point 208 is associated with the repartitioned workflow and processing moves to step 707. At step 707 the details of the delegation are logged as a pending new entry 304 in the server active delegations data 303 and processing moves to step 708. At step 708 a notification is awaited from the client system 108 that the delegation is pending on the client system 108 and once received processing moves to step 709. At step 709 the delegation is activated on the server system 109 and a notification is provided to the client system 108 and delegation server 111. Processing then moves to step 705 and ends.

Figure 8:
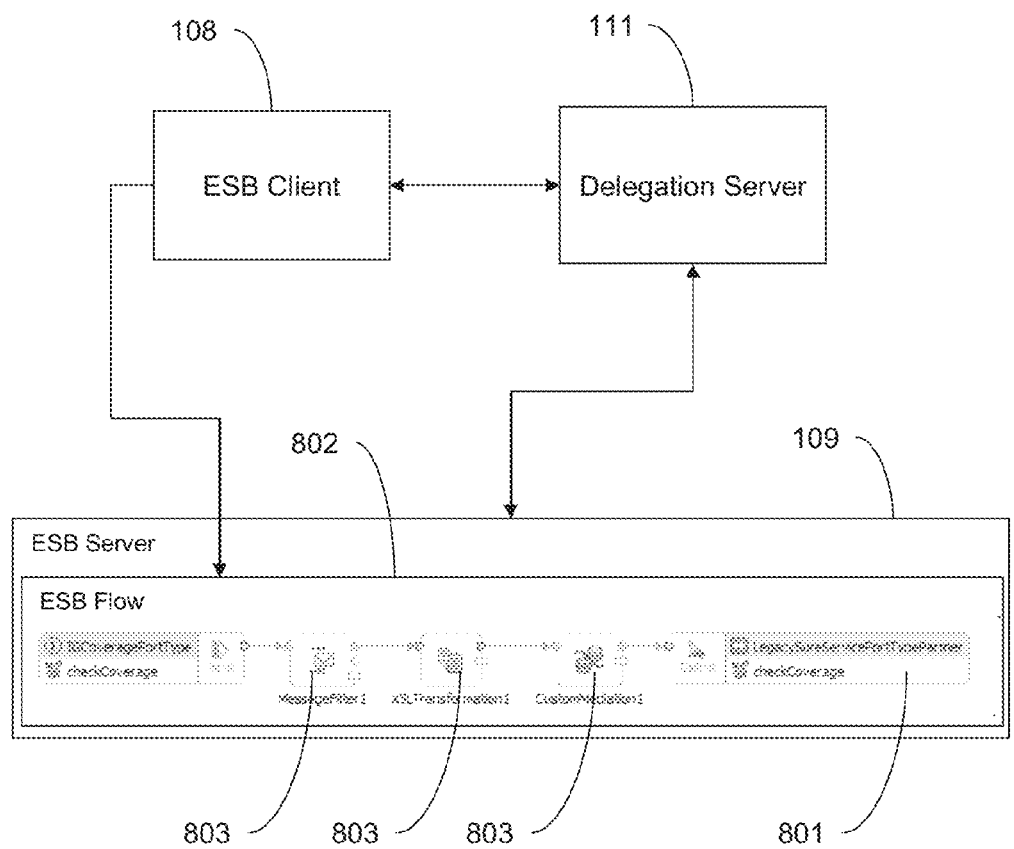
FIGS. 8 and 9 are schematic representations of an example of the re-partitioning of a workflow performed under the control of the delegation server application program of FIG. 4.
Figure 9:
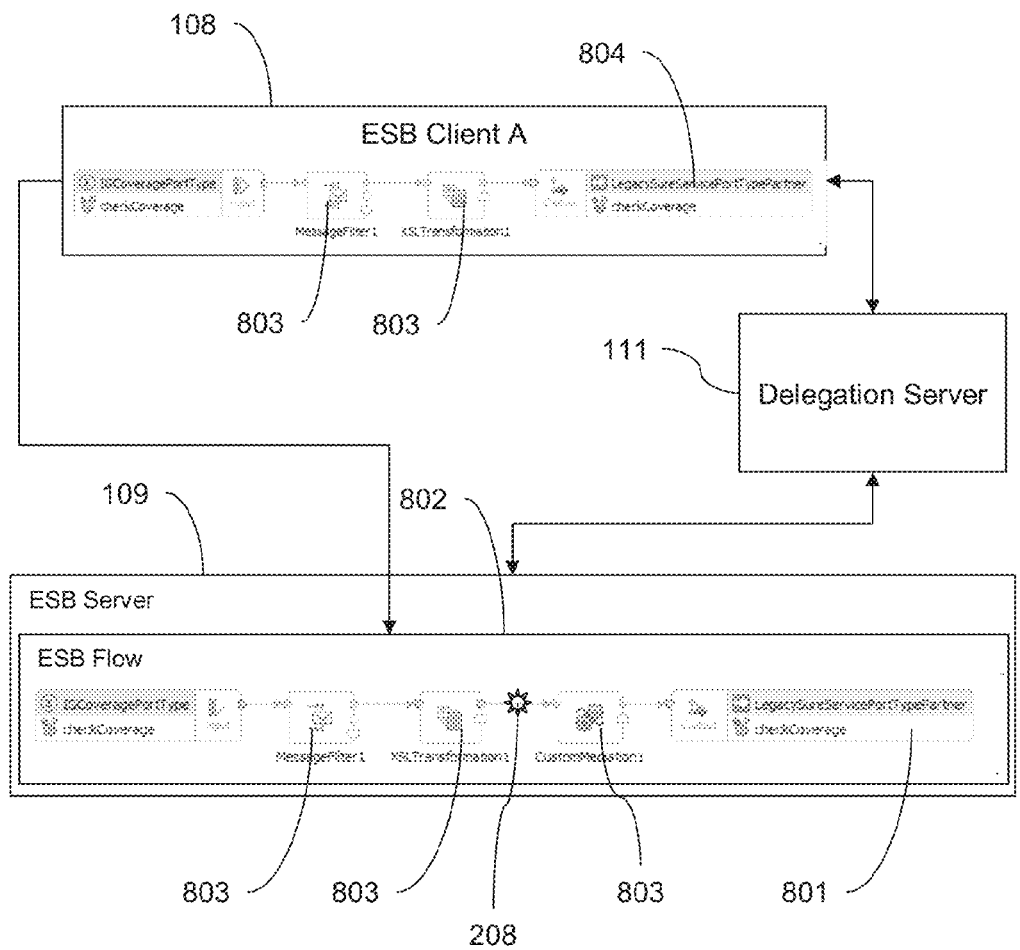

With reference to FIG. 8, the server partition 801 of an example workflow 802 is shown being processed by the server system 109 in response to an input from the client system 108. The server partition 801 comprises three logic elements or modules 803. The delegation server system 111 monitors the processing of the server system 109 in accordance with the predetermined performance measures 403. With reference to FIG. 9, in response to the performance measures 403 meeting one or more of the relevant thresholds indicating that the server system is unacceptably stressed, the delegation server identifies two logic elements 803 and has delegated them for subsequent processing in the client partition 804 of the workflow 802. It will be noted that the delegated logic modules 803 are not removed from the server partition 801 of the workflow 802 but their processing in the relevant instance of the workflow 802 circumvented by the use of the hook point 208.

In another embodiment, data indicating whether or not a given workflow logic element or module may be delegated is provided in a service or module registry. Logic elements may be identified in groups or by predetermined characteristic as being delegable or not as the case may be.

In a further embodiment, the delegation server is arranged, prior to delegating logic elements for a workload to a given system, to determine the capacity of that system to process the proposed delegated logic elements. The processing capacity of the given system may be measured against one or more predetermined performance criteria. Such criteria may be at least partially in common with the performance criteria 403 described above. In other words, the delegation server may be arranged to determine the processing capacity of the client system for processing the identified logic modules and only perform the repartitioning of the workflow if the processing capacity of the first system meets a predetermined threshold. In another embodiment, the determination of the capacity of the system to which logic elements are proposed to be delegated is determined internally by that system. If the system determines that it does not have the required processing capacity or resource then it may be arranged to reject a proposed delegation initiated by the delegation server functionality.

As will be understood by those skilled in the art, any suitable performance measures may be employed. For example, network bandwidth measures may be used to determine if a given delegation may result in increased network traffic and thus unacceptably strain the network. Such a delegation may then be aborted or reformulated to reduce the increase in network traffic.

As will be understood by those skilled in the art, embodiments of the invention are not limited to the ESB messaging architecture or to mediation workflows but may be applied to any suitable messaging or client/sever based workflows or workloads. Furthermore, the architecture of embodiments is not limited to the delegation server models illustrated herein. The functionality for providing and managing such delegation may be provided at any singe point or distributed throughout a given computer system. The functionality may be provided in one or more stand-alone code modules or programs or integrated with functionality of any other systems.

As will be understood by those skilled in the art, embodiments are not limited to use between client and server systems but may comprises server to target system arrangements or peer to peer architectures.

In some embodiments, one or more mechanism for reversal of delegations may be provided. For example, such mechanisms may be time based or dependent on the predetermined performance measures no longer meeting the relevant threshold.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. An apparatus for workload placement in a computer system the apparatus comprising:
   a processing component arranged for processing a workflow across a first system and a second system, the workflow comprising a first partition of one or more logic modules processed by the first system and a second partition of one or more logic modules processed by the second system;
   a monitoring component arranged for monitoring performance of the second system in response to the processing of the workflow against one or more performance measures;
   an identifying component for identifying one or more logic modules in the second partition to be processed by the first system when one or more of the one or more performance measures is within a predetermined range, using delegable elements data and active delegations data of the second system associated with the workflow, wherein the one or more logic modules identified are common delegable elements between the first system and the second system; and
   a repartitioning component arranged for dynamically repartitioning the one or more logic modules identified from the second partition to the first partition, wherein subsequent processing of the one or more logic modules identified is performed by the first system in one or more subsequent instances of the workflow using hook data identifying a modified partition point to start processing in the workflow resulting from a respective delegation in the dynamic repartitioning, and wherein the one or more logic modules identified in the second partition remain in the second system while processing in a respective instance of the workflow is circumvented in the second system by use of the hook data.

2. The apparatus of claim 1 wherein the computer system comprises an Enterprise Service Bus (ESB), the first system comprises an ESB client and the second system comprises an ESB server.

3. The apparatus of claim 1 wherein the one or more logic modules comprise ESB logic modules and wherein the workflow comprises mediation logic.

4. The apparatus of claim 1 wherein the one or more performance measures comprise at least one of a selection of the one or more performance measures of a machine on which the second system is running, the one or more performance measures of processing of one or more workflows, and one or more measures of network performance or capacity between the first and second systems.

5. The apparatus of claim 1 wherein an identification of the one or more logic modules in the second partition that may be processed by the first system is performed using a predetermined identification of delegable logic modules.

6. The apparatus of claim 4 wherein a capacity of the first system for processing the one or more logic modules identified is measured against one or more predetermined performance criteria and wherein performing the repartitioning of the workflow when the capacity of the first system meets a predetermined threshold.

7. The apparatus of claim 1 wherein the processing of the one or more logic modules identified from the second partition is delegated to a third system wherein processing of the one or more logic modules identified is performed by the third system in one or more subsequent instances of the workflow.

8. The apparatus of claim 1 wherein the repartitioning of the one or more logic modules identified is performed with respect to one of the workflow with respect to the second system and one or more other systems, and to one or more other associated workflows with respect to the first and second systems.

9. A method for workload placement in a computer system comprising:
   processing a workflow across a first system and a second system, wherein the workflow comprising a first partition of one or more logic modules processed by the first system and a second partition of one or more logic modules processed by the second system;
   monitoring the performance of the second system in response to the processing of the workflow against one or more performance measures;
   in response to one or more of the one or more performance measures being within a predetermined range, identifying the one or more logic modules in the second partition to be processed by the first system, using delegable elements data and active delegations data of the second system associated with the workflow, wherein the one or more logic modules identified are common delegable elements between the first system and the second system; and
   repartitioning the one or more logic modules identified from the second partition to the first partition dynamically, wherein subsequent processing of the one or more logic modules identified is performed by the first system in one or more subsequent instances of the workflow using hook data identifying a modified partition point to start processing in the workflow resulting from a respective delegation in the dynamic repartitioning, and wherein the one or more logic modules identified in the second partition remain in the second system while processing in a respective instance of the workflow is circumvented in the second system by use of the hook data.

10. The method of claim 9 wherein the computer system comprises an Enterprise Service Bus (ESB) and the first system comprises an ESB client and the second system comprises an ESB server.

11. The method of claim 9 wherein the one or more logic modules comprise ESB logic modules and wherein the workflow comprises mediation logic.

12. The method of claim 9 wherein the one or more performance measures comprise at least one of a selection of the one or more performance measures of a machine on which the second system is running, the one or more performance measures of the processing of one or more workflows and one or more measures of network performance or capacity between the first system and the second system.

13. The method of claim 9 wherein the identification of the one or more logic modules in the second partition that may be processed by the first system is performed using a predetermined identification of delegable logic modules.

14. The method of claim 12 wherein a capacity of the first system for processing the one or more logic modules identified is measured against one or more predetermined performance criteria and only performing the repartitioning of the workflow when the capacity of the first system meets a predetermined threshold.

15. The method of claim 9 wherein the processing of the one or more logic modules identified from the second partition is delegated to a third system wherein processing of the one or more logic modules identified is performed by the third system in one or more subsequent instances of the workflow.

16. The method of claim 9 wherein the repartitioning of the one or more logic modules identified is performed for: a selected one of a given workflow with respect to the first system and the second system; with respect to one or more other associated workflows with respect to the first system and the second system; and with respect to the given workflow with respect to the second system and one or more other systems.

17. A computer program product for workload placement comprising computer executable instructions stored on a computer readable non-propagation medium and loadable into a memory of a computer, which when executed by the computer direct the computer to:
  process a workflow across a first system and a second system, the workflow comprising a first partition of one or more logic modules processed by the first system and a second partition of one or more logic modules processed by the second system;
  monitor the performance of the second system in response to the processing of the workflow against one or more performance measures;
  in response to one or more of the one or more performance measures being within a predetermined range, identify one or more logic modules in the second partition to be processed by the first system, using delegable elements data and active delegations data of the second system associated with the workflow, wherein the one or more logic modules identified are common delegable elements between the first system and the second system; and
  repartition the one or more logic modules identified from the second partition to the first partition dynamically, wherein subsequent processing of the one or more logic modules identified is performed by the first system in one or more subsequent instances of the workflow using hook data identifying a modified partition point to start processing in the workflow resulting from a respective delegation in the dynamic repartitioning, and wherein the one or more logic modules identified in the second partition remain in the second system while processing in a respective instance of the workflow is circumvented in the second system by use of the hook data.

18. The computer program product of claim 17 wherein the one or more performance measures comprise at least one of a selection of one or more of the one or more performance measures of a machine on which the second system is running, one or more performance measures of processing of one or more workflows, one or more measures of network performance or capacity between the first system and the second system.

19. The computer program product of claim 17 wherein the computer executable instructions stored on the computer readable non-propagation medium for the identification of the one or more logic modules in the second partition that may be processed by the first system when executed by the computer direct the computer to use a predetermined identification of delegable logic modules.

20. The computer program product of claim 18 wherein a capacity of the first system for processing the one or more logic modules identified is measured against one or more predetermined performance criteria and wherein the computer executable instructions stored on the computer readable non-propagation medium when executed by the computer only direct the computer to perform the repartitioning of the workflow when the capacity of the first system meets a predetermined threshold.

* * * * *